United States Patent [19]
Overby

[11] Patent Number: 5,261,946
[45] Date of Patent: Nov. 16, 1993

[54] AIR LINE VAPOR TRAP WITH AIR-WARMING SYSTEM

[75] Inventor: Kenneth W. Overby, Hamilton, Ind.

[73] Assignee: La-Man Corporation, Hamilton, Ind.

[21] Appl. No.: 833,956

[22] Filed: Feb. 11, 1992

[51] Int. Cl.$^5$ ............................................. B01D 51/00
[52] U.S. Cl. .................................... 95/39; 95/288;
55/269; 55/323; 55/424
[58] Field of Search ............................... 55/267–269,
55/323, 218, 482, 424, 23, 80

[56] References Cited

U.S. PATENT DOCUMENTS

| | | | |
|---|---|---|---|
| Re. 32,989 | 7/1989 | Mann | 55/323 |
| 1,458,005 | 6/1923 | Rohrer | 55/267 |
| 3,516,231 | 6/1970 | George | 55/267 |
| 3,876,400 | 4/1975 | Frantz | 55/267 |
| 3,890,122 | 6/1975 | Frantz | 55/212 |
| 4,097,248 | 6/1978 | Frantz | 55/33 |
| 4,108,617 | 8/1978 | Frantz | 55/162 |
| 4,113,451 | 9/1978 | Frantz | 55/162 |
| 4,468,239 | 8/1984 | Frantz | 55/162 |
| 4,487,618 | 12/1984 | Mann | 55/323 |
| 4,519,810 | 5/1985 | Frantz | 55/162 |
| 4,600,416 | 7/1986 | Mann | 55/323 |
| 4,692,175 | 9/1987 | Frantz | 55/162 |
| 4,874,408 | 10/1989 | Overby | 55/218 |
| 4,889,544 | 12/1989 | Hsu | 55/268 |
| 4,891,051 | 1/1990 | Frantz | 55/162 |
| 4,925,466 | 5/1990 | Overby | 55/319 |
| 4,957,516 | 9/1990 | Daniels | 55/218 |
| 5,002,593 | 3/1991 | Ichishita et al. | 55/218 |
| 5,030,262 | 7/1991 | Overby | 55/431 |

*Primary Examiner*—Robert Spitzer
*Attorney, Agent, or Firm*—Barnes & Thornburg

[57] ABSTRACT

An apparatus and method for filtering compressed air has an inlet to admit a flow of compressed air, a filter where the compressed air is cooled and water vapor is coalesced therefrom, an area downstream of the filter where the compressed air is passively warmed when the temperature of the surroundings is higher than the compressed air passing therethrough, and an outlet for discharging the flow of compressed air. The compressed air is passively warmed in the area downstream of the filter in order to increase its moisture retaining capacity. This is done to inhibit or reduce condensation of water from the compressed air which would otherwise cause corrosion in airlines, valves, and pneumatically operated devices through which the compressed air travels.

31 Claims, 2 Drawing Sheets

AIR LINE VAPOR TRAP WITH AIR-WARMING SYSTEM

BACKGROUND AND SUMMARY OF THE INVENTION

The present invention is directed to compressed air filtration systems, and particularly to apparatus for removing dirt, dust, oil, rust, and moisture from a flowing gaseous medium such as compressed air. More particularly, the present invention is directed to a compressed air filtration apparatus having passive heat exchanger fins for warming compressed air traveling through the apparatus.

Filters are used to remove contaminants from compressed air lines. Untreated compressed air contains tiny particles of dirt, dust, oil, rust, and moisture. It is known to install an in-line filter in a compressed air supply line to clean and dry the compressed air to minimize disruption of pneumatically operated tools and machinery. Two-stage compressed air filtration systems which operate to remove harmful moisture, oil, and other contaminants from compressed air lines are also known. For example, two-stage filtration systems are disclosed in U.S. Pat. Nos. 4,874,408 to Overby; 4,600,416 to Mann; and Re. 32,989 to Mann.

Liquid water is one of the most corrosive elements that can be present in a compressed air supply system. Liquid water causes rust to form in the various pipes, valves, cylinders, air-operated tools or machinery, and other apparatus included in a compressed air supply system. Unwanted liquid condensation can occur whenever moisture-laden compressed air is cooled to a temperature below the dew point temperature. Various approaches have been developed to dehumidify a flow of compressed air. The moisture content of the compressed air after it exits from a moisture-removal filter varies by the type of unit that is used. Chemical, refrigerated, and mechanical dehumidifying systems are known.

Many chemical systems for drying compressed air have been developed to dehumidify compressed air and minimize corrosion problems in compressed air lines and pneumatic equipment. Desiccate dryers use a chemical or drying agent to absorb moisture present in a compressed air stream. For example, hygroscopic chemical-based compressed air desiccating systems are disclosed in U.S. Pat. Nos. 4,519,819 to Frantz; 4,468,239 to Frantz; 4,891,051 to Frantz; 4,108,617 to Frantz; and 5,002,593 to Ichishita et al. However, desiccant chemicals can be expensive and require periodic replacement or regeneration for continued use.

It is also known to use various power-consuming refrigeration units to cool and dehumidify compressed air. Such systems are expensive to use because they require external means such as electricity and/or water to operate. In addition, refrigeration units are expensive to maintain and service. In some cases, the supply of compressed air to an entire plant or module must be shut down during maintenance and service operations. Consequently, maintenance is often neglected leading to the presence of excess moisture and other contaminants in the compressed air supply system.

Another system for drying compressed air is based on purely passive mechanical elements. As compared to chemical-based systems, passive mechanical systems may be virtually maintenance-free, requiring at most only infrequent filter replacements. Such mechanical drying systems can use baffles, impingement plates, inverse flow, evaporation, or wire mesh coalescers to remove water from compressed air. For example, U.S. Pat. No. 4,668,256 to Billiet discloses the use of baffles and impingement plates; U.S. Pat. Nos. 4,822,387 and 4,957,516 to Daniels disclose an inverse flow filter assembly having internally disposed heat exchange cooling fins; and U.S. Reissue Patent No. 32,989 to Mann discloses a two-stage wire mesh coalescer and evaporator cartridge. Other passive mechanical systems for drying compressed air are disclosed, for example, in U.S. Pat. Nos. 4,600,416; 4,874,408; 5,030,262; 4,385,913; and 2,512,785.

Although passive mechanical systems have many advantages, the moisture content of air passed through a mechanical air drying system is typically much higher than that of air passed through desiccating systems. For example, while desiccant-based drying systems may generate very dry air having a dew point as low as $-40°$ F., a conventional mechanical filter may produce dry air having a dew point normally ranging from $10°$ to $35°$ F. at normal atmospheric pressure. At higher pressures encountered with the use of compressed air, the dew point temperature correspondingly rises. For example, compressed air at 100 PSIG has a dew point of between about $60°$ to about $90°$ F.

A high dew point temperature increases the chance of water condensation from water vapor present in compressed air in an air line, pneumatic tool, or other air-operated machine. If ambient air temperature is below the dew point, compressed air leaving the mechanical drying system may spontaneously cool below the dew point during its passage through a downstream compressed air line or cool during expansion in the air tools, thereby causing condensation of damaging liquid water in the air line or tool and increasing opportunities for corrosion damage to air lines and air-operated tools. In practice, the possibility of such unwanted condensation has limited use of passive mechanical compressed air drying systems, maximum air line length after a compressed air filter station to relatively short distances (less than about 25 feet), or required multiple spaced-apart filters for longer distance air lines.

A passive compressed air filtration apparatus for drying compressed air to produce clean, dry, and warm compressed air without using expensive chemicals and electricity would be a welcome improvement. As long as the cleaned and dried compressed air discharged from such a filtration apparatus had a warm enough temperature (one that was above the prevailing dew point temperature), then the opportunity for any remaining water vapor present in the discharged compressed air to condense in the compressed air supply line, valves, or various pneumatically operated tools or machinery would be kept to a minimum.

According to the present invention, an apparatus is provided for filtering compressed air. The apparatus includes an air treatment unit having an inlet and outlet, a water vapor filter, and a sump. The water vapor filter provides means for expanding compressed air introduced into the air treatment unit to cool the compressed air. This promotes coalescence of water vapor in the compressed air that passes through the air treatment unit into droplets. The sump is an enclosure that provides means for receiving droplets produced by the water vapor filter and for conducting compressed air passing through the air treatment unit toward the outlet.

By increasing the moisture-retaining capacity of compressed air, it is possible to minimize condensation in air lines and tools and the corrosion problems that are caused by such condensation.

The sump includes fin means for transferring heat from the surroundings to warm the cooled compressed air exiting the water vapor filter as it passes through the sump when the temperature of the surroundings is higher than that of cooled compressed air. The flow of compressed air is heated as it flows through the sump so that the moisture-retaining capacity of the compressed air is enhanced before it is discharged from the air treatment unit through the outlet. By increasing the moisture-retaining capacity of compressed air, it is possible to minimize condensation in air lines and tools and the corrosion problems that are caused by such condensation.

In preferred embodiments, the sump is provided by a hollow housing formed to include a chamber. A porous structure is positioned to occupy a lower portion of the chamber and configured to include honeycomb cells for receiving and storing water droplets produced by the water vapor filter. Compressed air exiting the water vapor filter flows above the porous structure through an upper portion of the chamber on its way toward the outlet of the air treatment unit.

The housing includes an upper shell coupled to a lower shell. Each shell is made of a thermally conductive material such as aluminum and includes a plurality of integrally formed, spaced-apart fins. These external fins function as heat-absorbing elements that extract heat from the atmosphere and transfer it into the chamber to heat the somewhat cool compressed air passing through the chamber.

The apparatus may also include a second-stage filter positioned to filter moisture and other contaminants from compressed air that has exited from the sump and is flowing toward the outlet of the air treatment unit. Any remaining moisture will be trapped in this second stage filter to ensure that only clean and dry compressed air is discharged from the air treatment unit.

In operation, unwanted moisture is removed by expanding the compressed air passing through the water vapor filter. This expansion cools the compressed air to a low temperature and promotes condensation of water vapor into water droplets. These water droplets can coalesce in the water vapor filter to form large droplets that fall under gravity into the underlying sump where the droplets are trapped in the porous honeycomb structure. At the same time, the cool and dry compressed air flows along a path above the porous structure through the sump and toward the second stage filter. Therefore, moisture removal is advantageously accomplished using a reliable and economical passive mechanical system without relying on any costly chemical-based desiccant drying systems or energy-consuming refrigeration systems.

When the ambient air temperature is higher than that of the cool and dry compressed air, the fins on the housing absorb heat from the atmosphere and transfer it into the sump to heat the cool compressed air to a preferred warmer temperature. Ideally, the compressed air is warmed to a temperature that is about equal to the temperature of the compressed air admitted into the air treatment unit through the inlet. Advantageously, such warming takes place using only heat extracted from the atmosphere around the housing without need for any electric heaters or the like. This warming results in discharge of a compressed air flow that is warm enough to hold and carry larger amounts of water vapor so that the possibility that condensation will occur and cause corrosion problems to develop in pipes and tools downstream of the air treatment unit is minimized. It is more likely that condensation will occur if the compressed air discharged from the air treatment unit is too cool because cool air is unable to retain a lot of moisture.

Essentially, the filtering apparatus in accordance with the present invention provides an adiabatic evaporation device that is designed to treat relatively large areas of a compressed air system. This device uses coalescing and adiabatic evaporation where no temperature change occurs in the inlet to outlet air temperature. Advantageously, by using adiabatic evaporation (humidification) and not cooling the air exiting the filtering apparatus, the distance or area of protection (from condensation by air temperature reduction) is extended over conventional filtering apparatus.

The extended distance or protection area between the filter and the point of use is beneficial as it increases the area that a single filter can service. By sizing and installing the air filter correctly, a single filter one size larger than two smaller filters can often be used. This in turn requires fewer filters and elements and lowers the yearly operating costs of maintaining clean dry air in a plant.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
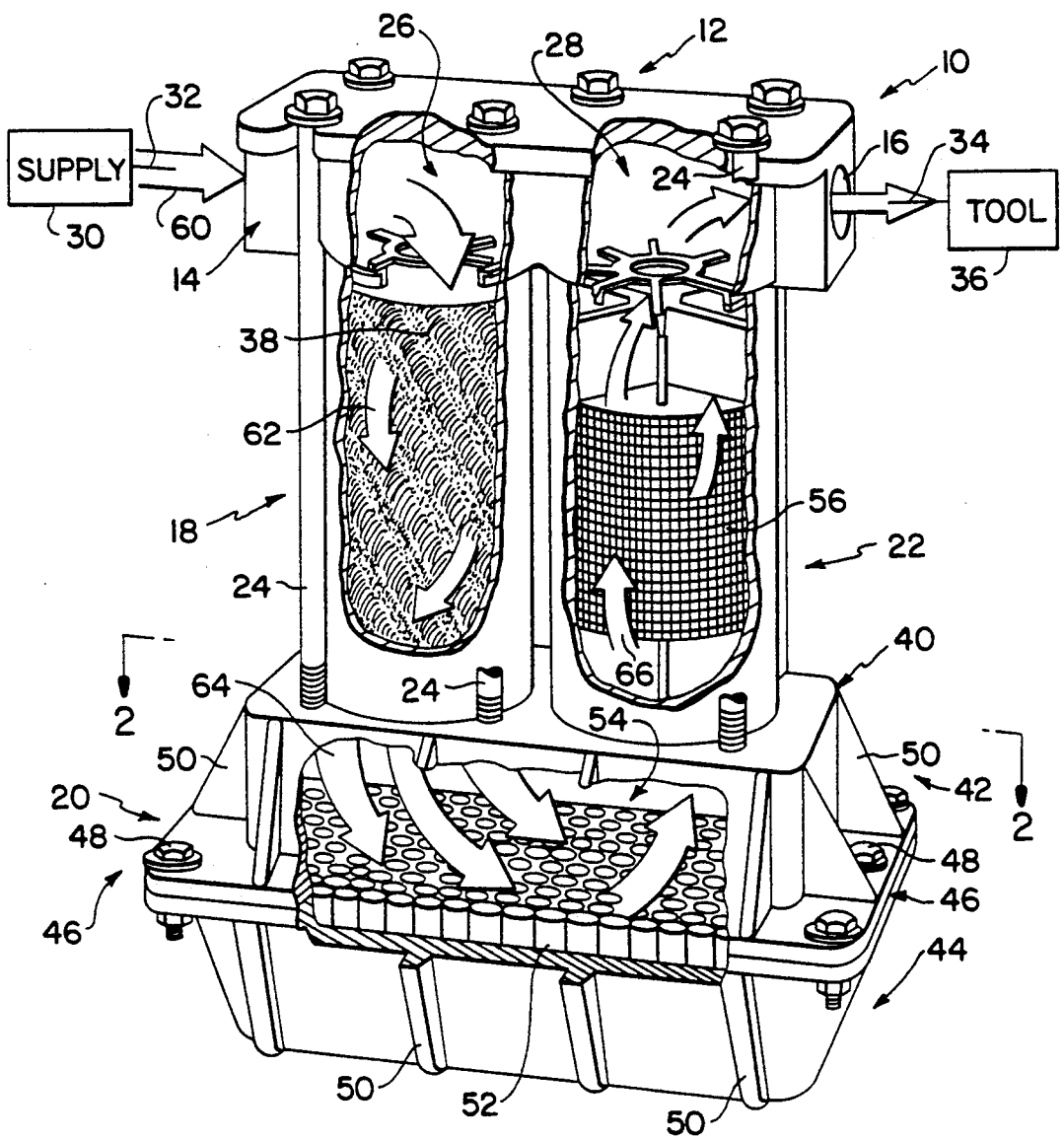
FIG. 1 is a perspective view of an apparatus for filtering compressed air in accordance with the present invention, with portions broken away to show a first stage filter, a housing containing a porous structure for receiving droplets produced by the first stage filter and external fins for using heat provided by the surroundings to warm compressed air flowing through the housing, and a second stage filter.

A preferred embodiment of a compressed air-filtering apparatus 10 is shown in FIG. 1. Filtering apparatus 10 is used to remove harmful moisture, dirt, dust, oil, rust, and other contaminants from a compressed air line. Apparatus 10 is typically installed in a compressed air supply line at the point of use to filter compressed air before it is introduced into various power tools or air-operated devices of the type that might be damaged by exposure to moisture or other airborne contaminants.

Apparatus 10 includes a manifold 12 formed to include an inlet 14 and outlet 16, a first stage filter 18, a sump 20, and a second stage filter 22 as shown in FIG. 1. Although apparatus 10 is configured to conduct a flow of compressed air along a downward, lateral, and upward path between inlet 14 and outlet 16, it will be understood that it is within the scope of the present invention to vary the path followed by the compressed air flow through the filters 18, 22 and sump 20, depending upon the filtering application. In some applications, it is desirable to introduce compressed air into a filter unit at a location other than the top of the filter unit.

Apparatus 10 is preferably a two-stage filter made of modular construction. Bolts 24 are used to couple manifold 12 to sump 20 to hold the first and second stage filters 18, 22 in spaced-apart parallel relation between manifold 12 and sump 20 as shown in FIG. 1. Bolts 24 can be removed to permit easy replacement or service of filters 18 and 22. It will be understood that the present invention is not limited to use in connection with a modular, two-stage filter assembly of the type shown in FIG. 1. Rather, the means disclosed herein for using heat in the atmosphere surrounding sump 20 to warm the cooled compressed air flow passing through sump 20 has wide application in other compressed air-filtering apparatus to enhance the moisture-retaining capacity of compressed air discharged from such apparatus.

Manifold 12 is formed to include an inlet channel 26 for conducting untreated compressed air from inlet 14 to the first stage filter 18. The compressed air is cooled by expansion in channel 26 of manifold 12 to promote condensation to help dry the compressed air. Manifold 12 also includes a channel 28 for conducting treated compressed air from second stage filter 22 to outlet 16. Compressed air is delivered from supply 30 through conventional pipe systems 32 to manifold inlet 14 so that it can be cleaned and dried in filtering apparatus 10. Treated compressed air is discharged from apparatus 10 through pipe systems 34 for use in any suitable air-operated tool or machine 36.

First stage filter 18 includes a mesh 38 that captures larger contaminant particles (not shown) entrained in the flow of compressed air and causes moisture (e.g., water vapor) in the compressed air to coalesce and form droplets (not shown). These liquid droplets fall under gravity into sump 20 and are thus separated from the flow of compressed air. At this stage, the compressed air is at a temperature that is cooler than the temperature of the compressed air-entering apparatus 10 through inlet 14 because of the expansion cooling that occurred in manifold 12. Reference is hereby made to U.S. Pat. No. 4,874,408 to Overby for a description of a suitable water or oil vapor coalescing filter.

Figure 2:
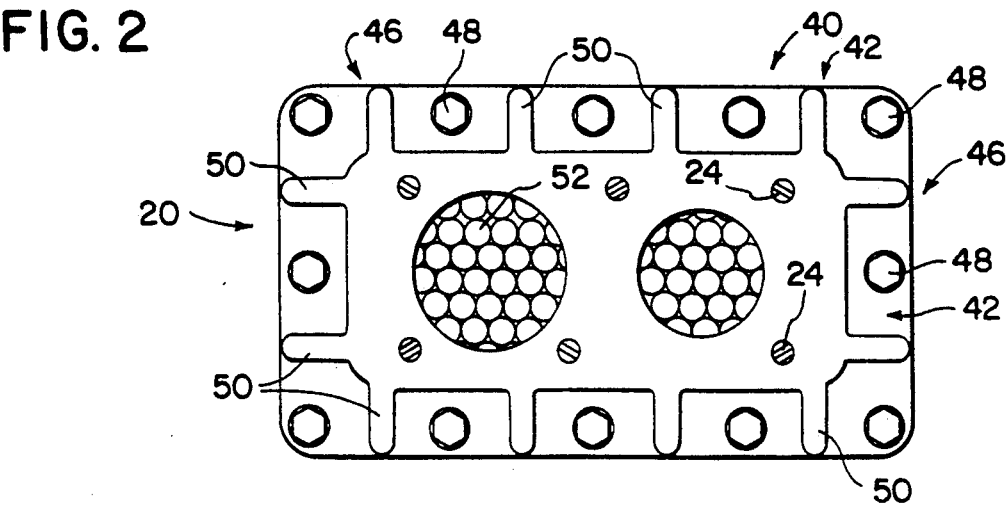
FIG. 2 is a sectional view taken along lines 2—2 of FIG. 1 showing a top view of the upper shell forming the sump housing and the placement of heat-absorbing fins around the exterior of the upper shell.

Sump 20 is contained in a hollow housing 40 formed by attaching an upper shell 42 to a lower shell 44 at perimeter flange 46 using flange bolts 48. The shells 42, 44 are preferably made of a thermally conductive material such as aluminum and each shell 42, 44 is integrally formed to include a plurality of spaced-apart atmospheric heat-absorbing fins 50 as shown in FIGS. 1 and 2. These fins 50 absorb heat from the atmosphere and transfer it through the walls of the upper and lower shells 42, 44 to heat the relatively cool temperature compressed air flowing through hollow housing 40 to a warmer temperature. Warming the air by this type of passive inverse heat transfer enables the air to carry and hold larger amounts of water vapor without risk of condensation. Advantageously, electric heaters or other types of external power-consuming heat exchangers are not needed to warm the compressed air to a predetermined temperature.

A porous honeycomb structure 52 is disposed in a lower portion of the interior region inside hollow housing 40 and supported by lower shell 44. This honeycomb structure 52 is formed to include a plurality of vertical passages or cells for receiving liquid droplets produced in and discharged from the overlying first stage filter 18. The honeycomb structure, 52 cooperates with the side and bottom walls of hollow housing 40 to define a zone therein of substantially zero air movement for collection of liquid droplets. A drain (not shown) can be provided if desired to drain liquid collecting in honeycomb structure 52. Reference is again made to U.S. Pat. No. 4,874,408 to Overby for a description of one suitable honeycomb structure.

As shown in FIG. 1, sufficient room is provided in housing 40 above the honeycomb structure 52 for compressed air to flow along a path between first stage filter 18 and second stage filter 22. In effect, compressed air flow channel 54 is provided inside upper shell 42 for conveying expansion cooled compressed air from the outlet of the first stage filter of the second stage filter 22. When the ambient temperature is higher than the temperature of the cooled compressed air, the heat-absorbing fins 50 integrally formed on upper shell 42 effectively extract heat from the atmosphere around upper shell 42 and transfer it into flow channel 54 to warm the cool compressed air traveling therethrough. It will be understood that this warming process can be controlled by selecting a material for the shell and fins of a certain thermal conductivity; sizing, shaping, and spacing the fins; choosing a wall thickness and interior surface area for each shell 42, 44; and knowing the temperature of the atmosphere and the expected temperature of the cool compressed air exiting the first stage filter 18.

It will be understood that the velocity of the compressed air flow lessens as it enters the hollow housing 40. This allows contaminant particles and moisture to collect in honeycomb structure 52. Particle-laden water (not shown) flows along the bottom inside lower shell 44 and out the drain (not shown) provided therein. The compressed air flow then passes out of flow channel 54 and into the second stage filter 22.

Second stage filter 22 includes a fiber mesh 56 that captures remaining particles that are entrained in the compressed air and have a size, for example, down to five microns entrained in the compressed air. Mesh 56 can include, for example, alternating spiral layers of wire mesh or screen and absorbent fabric. Also, any remaining droplets carried by the flow of compressed air are trapped in mesh 56 and eventually evaporated by the warm compressed air flowing therethrough. As a result, remaining moisture and contaminants are dried and filtered in the second stage filter 22. Reference is again made to U.S. Pat. No. 4,874,408 for a description of a suitable second-stage filter.

Advantageously, the filtering apparatus 10 for reducing moisture or vapor levels of compressed air has no moving parts, requires no electricity or costly chemicals, and can be installed easily at point of use or elsewhere using standard air line fittings. Further, the modular filtering apparatus 10 is configured to allow both for easy replacement of the filters 18 and 22 and facilitation of routine maintenance of manifold 12 and sump 20.

The upper and lower shells 42 and 44 are also configured to integrally define a plurality of heat-absorbing fins 50. In addition to mechanically stiffening the shells 42 and 44, the fins 50 advantageously increase the surface area presented to the atmosphere by the housing 40. When the ambient air temperature is greater than the compressed air temperature, this allows for a substantial increase in the rate and amount of heat transferred from the ambient atmosphere to compressed air passing through the flow channel 54 in housing 40, as compared to smooth-sided enclosures (not shown) that are otherwise substantially identical to housing 40. Although the fins 50 are integrally formed, it is possible to attach fins separately to the outer side walls of upper and/or lower shells 42, 44 to increase heat transfer rates. In addition, as will be appreciated by those skilled in the art, other types of projections, protrusions, indentations, or other elements for increasing heat absorption and transfer to compressed air flowing in flow channel 54 are contemplated in the present invention.

In operation, a flow of compressed air 60 containing water and/or oil vapor is received into manifold 12 through inlet opening 14 and directed downwardly toward first stage filter 18 by inlet channel 26 where it undergoes expansion cooling. The now cooler flow of compressed air 62 then passes downwardly out of manifold 12 and into and through mesh 38. During its passage through mesh 38, the water and/or oil vapors in compressed air 62 are coalesced into liquid droplets. The droplets are then carried into the sump housing 40. Since the cross-sectional dimension to air flow within sump housing 40 is greater than that within first stage filter 18, the velocity of air entering the sump housing 40 is reduced, and the liquid droplets fall by gravity and centrifugal force toward the bottom of the housing 40. Such droplets are captured within the essentially dead air space formed by honeycomb structure 52. Since the construction of honeycomb structure 52 prevents substantial air movement therewithin, revaporization of the liquid droplets is substantially eliminated.

In the meantime, the compressed air 64, which is now typically 75% to 95% dry, is heated during its passage through the flow channel 54 in the upper portion of housing 40. The heated compressed air 66 passes through an inlet into the second stage filter 22. At this time, the compressed air is warmed somewhat by friction as it travels through mesh 56. As the compressed air 66 passes upwardly through the fiber mesh 56 toward outlet 16 of manifold 12, any remaining water droplets that failed to drop into the honeycomb structure 52 are revaporized. This heated compressed air passes through the manifold outlet 16 and air line 34, and works to power the tool 36.

Apparatus 10 is an adiabatic evaporation device that operates as a point of use type filtration unit that separates and gasifies liquid water in a compressed airstream. Water vapor, which is a gas, is not a contaminant in a compressed air line until it condenses. The liquid water is a contaminant. With this apparatus 10 designed as a point of use unit, the heat of compression has dissipated as the air flows from the compressor to the point of use. The temperature of the compressed air is very close to the ambient air conditions at the point of use. This heat dissipation is what causes condensation and liquid to form. Warm air holds more moisture than cool air.

Apparatus 10 has air entering the filter with a temperature very near the ambient air temperature. The compressed air line 32 has a cross-section area of 1 to that of the cross section of the manifold 12 in channel 26 of at least 5. This 1 to 5 ratio is the expansion ratio in the manifold that cools the air to promote condensation. Once the air is cooled by expansion, the condensation is coalesced out in the first stage filter 18. As the air enters the enclosed base and chamber 40, the velocity is reduced due to the increase cross-sectional area of approximately 2 to 1. The air temperature as the air enters the housing 40 is cooler than the ambient temperature due to the expansion in the inlet channel 26 of manifold 12.

In this application, when the ambient temperature is greater than the compressed air temperature the compressed air is the cool substance that is absorbing heat from the ambient temperature externally around the filter apparatus 10. Precisely spaced exterior ribs 50 on the enclosed volume 40 containing the quiet zone 52 are used to increase the surface area for the heat transfer process. The ribs 50 are spaced apart from one another to give a large area between them so they are not absorbing heat from the same volume of air.

As the air exits the hollow housing 40, the temperature of the air has approached the ambient air temperature. This increase in temperature is the result of the cooler air-absorbing heat through the aluminum housing 40 supplied by the ambient air. The time element is supplied by the reduced velocity in the enclosed volume 40.

The second stage filter 22 collects any remaining liquid that is not separated in the coalescer or quiet zone. This liquid water is gasified by air that is flowing through the filter material 56 very much like a towel blowing in the wind on a clothesline. As the air flows through the filter media in the second stage filter 22; the air temperature is increased slightly by the friction of the filter media 56. This friction is also responsible for a pressure differential across the filter media. Warm air holds more moisture than cool air.

The warming of the air by the fins and by the friction of 1° or 2° F. will allow the warmer air to hold approximately 5% more water vapor. This warmer air will dry the liquid collected in the second stage filter 22, thus increasing the water vapor (which is a gas) of the air exiting the filter.

Figure 3:
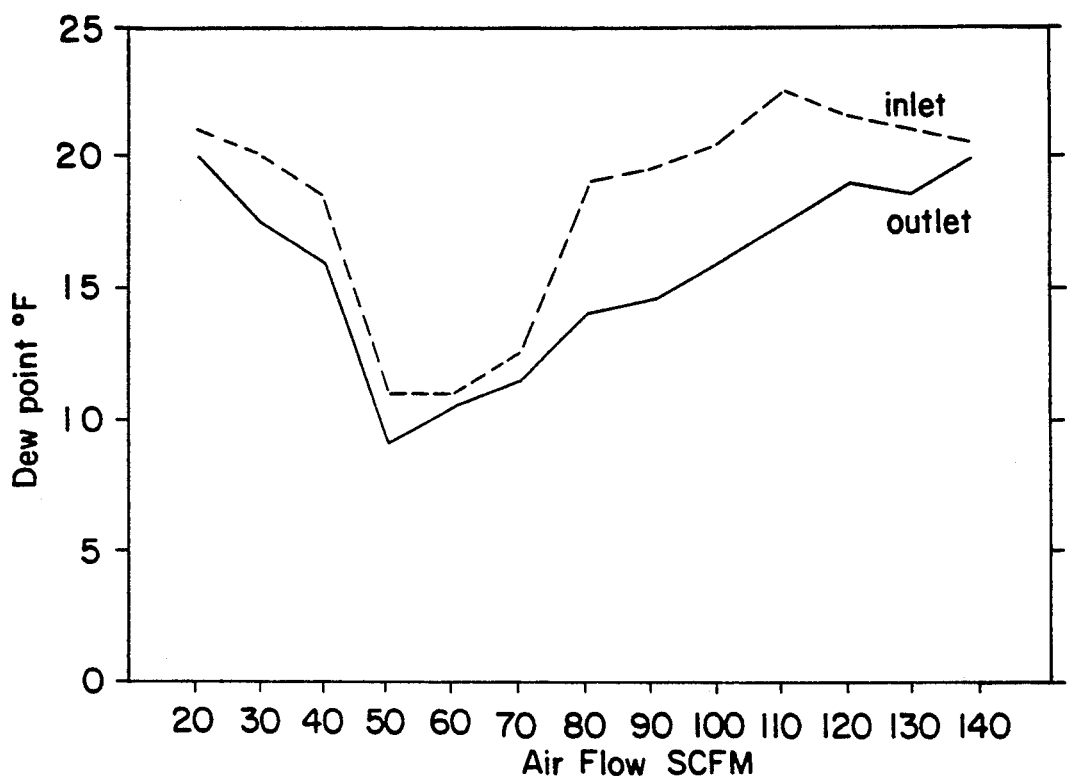
FIG. 3 is a plot of dew point temperature (° F.) versus compressed air flow rate (SCFM, Standard Cubic Feet per Minute) for a compressed air filtering apparatus without heat-absorbing fins (but otherwise of the type shown in FIGS. 1 and 2), which plot shows a compressed air temperature drop between inlet and outlet.
Figure 4:
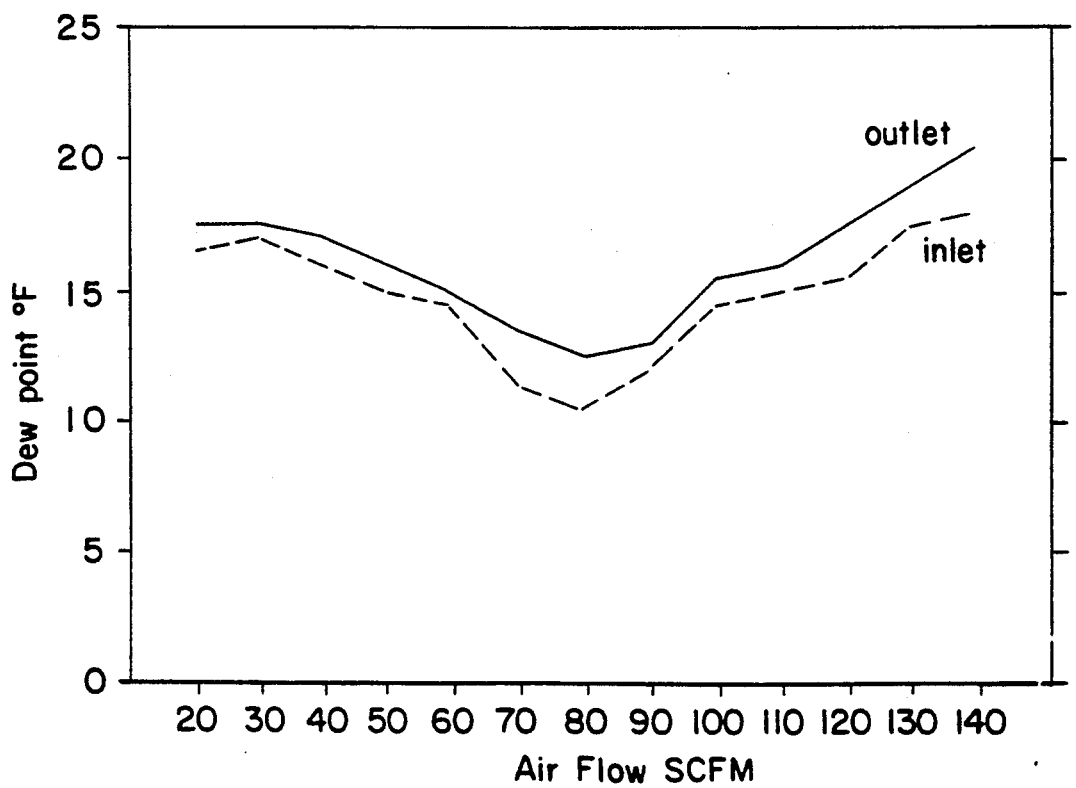
FIG. 4 is a plot of dew point temperature (° F.) versus compressed air flow rate (SCFM, Standard Cubic Feet per Minute) for a compressed air filtering apparatus including heat-absorbing fins in accordance with the present invention and of the type shown in FIGS. 1 and 2, which plot shows a compressed air temperature increase between inlet and outlet.

Test results demonstrating the ability of the heat-absorbing fins 50 shown in FIGS. 1 and 2 to extract heat from the atmosphere surrounding housing 40 and warm a flow of compressed air flowing through flow channel 54 are illustrated in FIGS. 3 and 4. It is clear from these test results that a filtering apparatus without heat-absorbing fins discharged a flow of compressed air having an outlet dewpoint temperature cooler than its inlet dewpoint temperature and that the same filtering apparatus with heat-absorbing fins (shown in FIGS. 1 and 2) discharged a flow of compressed air having an outlet dewpoint temperature warmer than its inlet dewpoint temperature. No externally powered heat exchanger was required to bring about this result.

A plot of dew point temperature versus compressed air flow rate for a compressed air-filtering system without heat-absorbing fins (but otherwise of the type shown in FIGS. 1 and 2) is illustrated in FIG. 3. This plot shows that the temperature of the compressed air dropped between the manifold inlet and outlet over a wide range of flow rates. Cooler compressed air is unable to retain a lot of moisture which could lead to condensation and corrosion problems.

A plot of dew point temperature versus compressed air flow rate for a compressed air filtering apparatus including heat-absorbing fins as shown in FIGS. 1 and 2 is illustrated in FIG. 4. This plot shows that the temperature of the compressed air increased slightly over a wide range of flow rates. This air-warming phenomena took place even though the compressed air had undergone expansion cooling in a passive mechanical filtering system. Warmer compressed air is able to retain more moisture which should minimize condensation and corrosion problems.

Although the invention has been described in detail with reference to certain preferred embodiments, variations and modifications exist within the scope and spirit of the invention as described and defined in the following claims.

I claim:

1. A method for processing a supply of compressed air, the method comprising
providing a supply of compressed air,
providing a housing for receiving, processing, and discharging the supply of compressed air to one of an air line and a pneumatically operated device,
wherein the processing includes drying the supply of compressed air, and
wherein the processing includes warming the compressed air after it has been dried to reduce the likelihood of formation of liquid water in the airline or the pneumatically operated device.

2. The method of claim 1, further including the step of filtering particulate matter from the compressed air prior to discharging from the housing.

3. The method of claim 1, wherein the step of drying the compressed air includes the step of cooling the compressed air to promote removal of liquid water from the compressed air.

4. The method of claim 1, wherein the step of drying the compressed air further includes the step of removing liquid water from the supply of the cooled compressed air.

5. The method of claim 4, wherein the step of removing liquid water from the compressed air further includes the step of coalescing liquid water from the supply of compressed air.

6. The method of claim 1, wherein the step of drying the compressed air includes the steps of cooling the air to promote the removal of liquid water from the compressed air and providing means for coalescing the liquid water condensed from the compressed air.

7. The method of claim 6, wherein the step of drying the compressed air includes the step of providing means for receiving the liquid water.

8. The method of claim 1, wherein the step of warming the compressed air includes the step of providing heat transfer means for facilitating the transfer of heat from the surroundings outside the housing to warm the compressed air when the temperature of the surroundings is higher than the temperature of the dried compressed air passing therethrough.

9. The method of claim 8, wherein the step of providing heat transfer means further includes the step of providing fins on the housing to promote the transfer of heat from the surroundings to the dried compressed air.

10. A method for processing compressed air, the method comprising
providing a supply of compressed air for operating a pneumatically operated device,
providing a housing for receiving, processing, and discharging the compressed air,
cooling the compressed air to condense liquid water from the compressed air,
warming the compressed air after it has been cooled and the liquid water has been condensed to increase the moisture-carrying capability of the compressed air, and
filtering particulate matter from the compressed air.

11. An apparatus for filtering compressed air, the apparatus comprising
an air treatment unit formed to include an interior region, an inlet connected to and admitting a flow of compressed air into the interior region, and an outlet connected to and discharging the flow of compressed air from the interior region,
expanding means fluidly connected to the compressed air introduced into the air treatment unit through the inlet for cooling the compressed air and promoting coalescence of water vapor in the compressed air passing through the air treatment unit into droplets, the expanding means being coupled to the inlet, and
enclosure means fluidly connected to the expanding means for receiving droplets produced by the expanding means and for conducting compressed air passing through the air treatment unit from the expanding means toward the outlet, the enclosure means including passive heat transfer fin means, downstream of said expanding means, for facilitating the transfer of heat from the surroundings when the temperature of the surroundings is higher than the temperature of the cooled compressed air to warm the cooled compressed air exiting from the expanding means and passing through the enclosure means to enhance the moisture-retaining capacity of the flow of compressed air discharged from the air treatment unit through the outlet.

12. The apparatus of claim 11, wherein the enclosure means includes a housing formed to include a chamber having an inlet coupled to the expanding means and an outlet coupled to the air-discharging outlet of the air treatment unit and the fin means is appended to an external wall of the housing downstream of the expanding means relative to the flow of the compressed air.

13. The apparatus of claim 12, wherein the enclosure means further includes a porous structure positioned to occupy a lower portion of the chamber and configured to include passages for admitting droplets, the passages cooperate with the enclosure means and each other to prevent air flow through the porous structure so as to define a zone of substantially zero air movement, and the fin means includes a plurality of heat-absorbing members lying on the external wall of the housing and conducting heat from the surroundings outside the housing into the chamber to warm compressed air exiting the expanding means and flowing through an upper portion of the chamber above the porous structure toward the outlet of the housing.

14. The apparatus of claim 12, wherein the housing includes an upper shell and a lower shell coupled to the upper shell to define the chamber therebetween and the fin means are appended at least to the upper shell.

15. The apparatus of claim 14, the enclosure means further includes a porous structure positioned in the lower shell to occupy a lower portion of the chamber and the fin means are appended to the upper and lower shells.

16. The apparatus of claim 11, wherein the enclosure means includes a housing formed to include a chamber and a honeycomb structure positioned in the chamber and formed to receive droplets produced by the expanding means and the fin means is appended to the housing to conduct heat from the surroundings into the chamber to warm cool compressed air exiting from the expanding means and passing through the chamber.

17. The apparatus of claim 16, wherein the housing includes an exterior wall and a plurality of heat-absorbing external ribs on the exterior wall.

18. The apparatus of claim 17, wherein the housing is made of a predetermined thermally conductive material to extract heat from the atmosphere outside the housing through the ribs and discharge heat through the wall into the chamber to warm the compressed air passing therethrough.

19. The apparatus of claim 16, further comprising means for collecting any remaining droplets that are discharged from the chamber without being retained in the honeycomb structure, the collecting means being positioned in the air treatment unit to conduct compressed air from the chamber to the outlet of the air treatment unit, the fin means including a plurality of heat-absorbing ribs made of a thermally conductive material to extract heat from the atmosphere outside the housing and deliver heat from the atmosphere into the chamber to provide means for warming the compressed air flowing through the chamber and into the collecting means to a predetermined temperature sufficient to evaporate droplets retained in the collecting means, thereby enhancing the moisture-retaining capacity of the compressed air exiting from the chamber.

20. The apparatus of claim 19, wherein the housing includes an upper shell having a first set of integral heat-absorbing ribs and a lower shell having a second set of integral heat-absorbing ribs and the upper and lower shells are coupled to one another to form the chamber therebetween.

21. An apparatus for filtering compressed air, the apparatus comprising means for directing a flow of compressed air, the directing means being formed to include an air-receiving inlet and an air-discharging outlet, means for coalescing liquid from vapor entrained in the flow of compressed air, the coalescing means being positioned in the directing means, and means for collecting liquid coalesced by the coalescing means in a sump, the collecting means being formed to include passive heat transfer fin means, downstream of the coalescing means, for facilitating the transfer of heat from the surroundings located outside of the collecting means when the temperature of the surroundings is higher than the temperature of the compressed air to insure warming of the compressed air travelling through the directing means and above the sump toward the air-discharging outlet to inhibit or reduce subsequent condensation of the heated compressed air when the heated compressed air is expanded, the collecting means being coupled to the coalescing means.

22. The apparatus of claim 21, wherein the fin means is positioned downstream of the coalescing means and relative to the flow of compressed air includes a housing defining a portion of the directing means and a plurality of heat-absorbing elements projecting outwardly from the housing.

23. The apparatus of claim 22, wherein the heat-absorbing elements cooperate to define means for absorbing heat from the atmosphere and the housing defines means for delivering said heat from the atmosphere into the housing to heat compressed air traveling through the directing means, thereby enhancing the moisture-retaining capacity of said compressed air.

24. The apparatus of claim 21, wherein the collecting means includes a housing forming the sump and a porous structure positioned in the sump and formed to receive droplets produced by the coalescing means and the fin means is appended to an exterior wall of the housing.

25. The apparatus of claim 24, wherein the housing includes an upper shell formed to define a portion of the directing means and a lower shell formed to define the sump, the upper shell is coupled to the lower shell, and the fin means is appended to at least the upper shell.

26. The apparatus of claim 25, wherein the fin means is appended to the upper and lower shells.

27. An apparatus for filtering compressed air, the apparatus comprising an air treatment unit including an inlet connected to and admitting a flow of compressed air and an outlet connected to and discharging the flow of compressed air, means fluidly connected to the inlet for cooling compressed air passing through the air treatment unit to promote coalescence of water vapor in the compressed air into droplets, enclosure means, downstream of the cooling means, for defining a droplet-receiving chamber coupled to the cooling means, and means fluidly connected to the enclosure means for conducting the flow of compressed air from the enclosure means to the outlet of the air treatment unit, the enclosure means including passive heat transfer fin means for facilitating the transfer of heat from the surroundings located outside of the conducting means when the temperature of the surroundings is higher than the temperature of the cooled compressed air passing therethrough to insure warming of the cooled compressed air so that the moisture-retaining capacity of compressed air discharged from the enclosure means into the conducting means is increased.

28. The apparatus of claim 27, wherein the enclosure means includes a hollow housing having an exterior surface and a plurality of fin means for extracting heat from the atmosphere surrounding the housing and storing it to provide a supply of heat, the plurality of fin means are appended to the exterior surface of the housing downstream of the coalescence relative to the flow of compressed air and the housing is made of a thermally conductive material to transfer heat stored in the fin means into the hollow housing to heat cooled compressed air traveling therethrough.

29. The apparatus of claim 28, wherein the enclosure means further includes a porous structure positioned in a lower portion of the droplet-receiving chamber and the fin means heat an interior wall of the housing to heat cooled compressed air passing through the droplet-receiving chamber above the porous structure along a path into the conducting means.

30. The apparatus of claim 27, further comprising means for collecting any remaining droplets that are discharged from the enclosure means into the conducting means, the collecting means being positioned in the conducting means, and the heating means includes a plurality of heat-absorbing ribs made of a thermally conductive material to extract heat from the atmosphere outside of the enclosure means and deliver heat from the atmosphere into the droplet-receiving chamber to heat cooled compressed air flowing therethrough and into the conducting means to said predetermined temperature sufficient to evaporate droplets retained in the collecting means positioned in the conducting means.

31. Apparatus for filtering a flow of compressed air, comprising:

inlet means for receiving the flow of compressed air;

means connected to the inlet means for cooling the compressed air and coalescing water vapor therefrom; and passive heat transfer means disposed downstream of the cooling and coalescing means for warming the flow of compressed air after coalescence of the water vapor when the temperature of the surrounds is higher than the temperature of the compressed air to increase the moisture retaining capacity thereof.

* * * * *